United States Patent [19]
Cahill et al.

[11] Patent Number: 6,144,118
[45] Date of Patent: Nov. 7, 2000

[54] HIGH-SPEED PRECISION POSITIONING APPARATUS

[75] Inventors: Steven P. Cahill, Newton; Bradley L. Hunter, Lexington, both of Mass.

[73] Assignee: General Scanning, Inc., Wilimington, Mass.

[21] Appl. No.: 09/156,895

[22] Filed: Sep. 18, 1998

[51] Int. Cl.$^7$ .................................................. H01L 21/00
[52] U.S. Cl. ................................. 310/12; 355/53; 355/72
[58] Field of Search .............................. 310/12; 318/135, 318/574, 625, 649, 687, 568.17, 568.18, 568.19; 33/1 M; 74/471 XY; 108/137, 138; 29/721, 760, 785; 355/53, 72

[56] References Cited

U.S. PATENT DOCUMENTS

| | | | |
|---|---|---|---|
| Re. 27,436 | 7/1972 | Sawyer | 310/12 |
| 3,791,739 | 2/1974 | Kawasaki | 356/358 |

(List continued on next page.)

OTHER PUBLICATIONS

McCarthy, "Accuracy in Positioning Systems", Motion Control Technology Conference Proceedings, 15 pages, Mar. 19–21, 1991.

McCarthy, "Positioning Systems: An Overview", pp. 1–21, undated.

(List continued on next page.)

*Primary Examiner*—Nestor Ramirez
*Assistant Examiner*—Judson H. Jones
*Attorney, Agent, or Firm*—Fish & Richardson, PC

[57] ABSTRACT

A high-speed precision positioning apparatus has a stage supported by a platen. The stage is driven by a plurality of drive motors that are co-planar with the stage and arranged symmetrically around the stage. The drive motors apply drive forces directly to the stage without any mechanical contact to the stage. The drive forces impart planar motion to the stage in at least three degrees of freedom of motion. In the remaining three degrees of freedom the motion is constrained by a plurality of fluid bearings that operate between the stage and the platen. The drive motors are configured as magnets, attached to the stage, moving in a gap formed in-between top and bottom stationary coils. Integral force cancellation is implemented by a force cancellation system that applies cancellation forces to the stage. The cancellation forces, which are co-planar with a center of gravity of the stage and any components that move with the stage, cancel forces generated by planar motion of the stage. Interferometric encoders are used as position detectors.

62 Claims, 9 Drawing Sheets

U.S. PATENT DOCUMENTS

| | | | |
|---|---|---|---|
| 3,864,564 | 2/1975 | Adkins | 318/577 X |
| 3,906,262 | 9/1975 | Shichida et al. | 310/12 |
| 3,935,486 | 1/1976 | Nagashima | 310/12 |
| 4,019,109 | 4/1977 | McCoy et al. | 318/640 |
| 4,282,469 | 8/1981 | Moriyama | 318/619 |
| 4,425,537 | 1/1984 | Phillips et al. | 318/640 |
| 4,455,512 | 6/1984 | Cornwell et al. | 318/135 |
| 4,464,030 | 8/1984 | Gale et al. | 354/4 |
| 4,485,339 | 11/1984 | Trost | 318/640 |
| 4,560,911 | 12/1985 | Chitayat | 318/135 |
| 4,621,926 | 11/1986 | Merry et al. | 356/363 |
| 4,654,571 | 3/1987 | Hinds | 318/687 |
| 4,742,286 | 5/1988 | Phillips | 318/640 |
| 4,776,701 | 10/1988 | Pettigrew | 356/356 |
| 4,808,892 | 2/1989 | Dreibelbis | 318/135 |
| 4,859,974 | 8/1989 | Kliman et al. | 335/229 |
| 4,952,858 | 8/1990 | Galburt | 318/647 |
| 4,984,891 | 1/1991 | Miyazaki et al. | 356/358 |
| 5,000,573 | 3/1991 | Suzuki et al. | 356/363 |
| 5,049,796 | 9/1991 | Seraji | 318/568.1 |
| 5,066,131 | 11/1991 | Iwata et al. | 356/401 |
| 5,098,190 | 3/1992 | Wijntjes et al. | 356/356 |
| 5,126,648 | 6/1992 | Jacobs | 318/640 |
| 5,153,494 | 10/1992 | Hollis, Jr. | 318/640 |
| 5,196,745 | 3/1993 | Trumper | 310/12 |
| 5,208,497 | 5/1993 | Ishii et al. | 310/12 |
| 5,294,854 | 3/1994 | Trumper | 310/90.5 |
| 5,334,892 | 8/1994 | Chitayat | 310/12 |
| 5,446,542 | 8/1995 | Muraoka | 356/400 |
| 5,486,923 | 1/1996 | Mitchell et al. | 356/356 |
| 5,504,407 | 4/1996 | Wakui et al. | 318/592 X |
| 5,528,118 | 6/1996 | Lee | 318/568.17 |
| 5,548,195 | 8/1996 | Doran | 318/568.19 |
| 5,559,600 | 9/1996 | Mitchell | 318/356 |
| 5,574,556 | 11/1996 | Mori et al. | 356/244 |
| 5,648,690 | 7/1997 | Hinds | 310/12 |
| 5,650,853 | 7/1997 | Honda et al. | 356/359 |
| 5,666,196 | 9/1997 | Ishii et al. | 356/356 |
| 5,708,319 | 1/1998 | Ban et al. | 310/309 |
| 5,751,585 | 5/1998 | Cutler et al. | 364/474.03 |
| 5,757,149 | 5/1998 | Sato et al. | 318/135 |
| 5,757,160 | 5/1998 | Kreuzer | 318/649 |
| 5,764,361 | 6/1998 | Kato et al. | 356/358 |
| 5,780,943 | 7/1998 | Ono | 310/12 |
| 5,847,960 | 12/1998 | Cutler et al. | 364/474.29 |

OTHER PUBLICATIONS

Meckl et al., "Experimental Evaluation of Shaped Inputs to Reduce Vibration for a Cartesian Robot", J. of Dynamic Systems, Measurement, and Control, 112:159–165, Jun. 1990.

Mekid et al., "Conceptual Design and Study of High Precision Translational Stages: Application to an Optical Delay Line", Precision Engineering, 21:29–35, 1997. Month Unknown.

Ryu et al., "Optimal Design of a Flexure Hinge Based XY⊖ Wafer Stage", Precision Engineering, 21:18–28, 1997. Month Unknown.

International Standard, ISO 8569, Mechanical Vibration and Shock—Measurement and Evaluation of Shock and Vibration Effects on Sensitive Equipment in Buildings, Second Edition, 1996. Month Unknown.

Lee et al., A Long Stroke and Ultra Precision XY⊖ Stage Using Simple Linear DC servo Actuators, American Society for Precision Engineering, 1997 Proceedings Vol. 16, pp. 341–344, month unknown.

Judell et al., "The Design of Vibration Control Solutions For Semiconductor Lithography and Inspection Equipment," Integrated Dynamics Engineering (1997), month unknown.

"Nanometer Precision in Positioning Control" dSpace News, p. 4, Fall 1998, month unknown.

Holmes et al., Atomic–Scale Precision Motion Control Stage (The Angstrom Stage), Annals of the CIRP, vol. 44/Jan. 1995, pp. 455–460, month unknown.

Williams et al., "Magnetic Bearing Stage for Photolithography", Annals of the CIRP vol. 42/Jan. 1993, pp. 607–610.

OPTRA, NanoGrid XY Metrology System: Model A (High Resolution), OPTRA, Inc., Jan. 1998.

OPTRA, The NanoGrid™ Principle of Measurement, OPTRA, Inc., Oct. 1997.

Linear Micro Encoder, 5T16 Series, MicroE ISO 9001 Registered, http://www.micro–e.com/lme.htm, Feb. 24, 1998.

HIGH-SPEED PRECISION POSITIONING APPARATUS

BACKGROUND OF THE INVENTION

This invention relates to high-speed precision positioning apparatuses useful for processing of devices such as semiconducting wafers, for micro-scale experimentation, or for high resolution electron microscopy of biological or other samples.

Semiconductor processing equipment often requires high-precision positioning of a silicon wafer. Large-size wafers with very small features often require high-precision positioning combined with a large range motion of the wafer stage that supports the wafer.

In addition to high precision and a large range motion, high-speed scanning is useful for achieving high manufacturing throughput.

A typical example of semiconductor processing equipment is a laser used in microlithography. Certain traditional systems for semiconductor laser processing include a translation stage that can support the wafer and move it under a fixed laser beam. The wafer-supporting translation stage may move along the X or Y directions, for example.

In certain processing equipment a linear motor and a bearing system are used to move the wafer-supporting stage along a rail in the X-direction. To move the wafer-supporting stage in the Y-direction an intermediate rail is used that carries the rail and the wafer-supporting stage in the Y-direction while allowing the wafer-supporting stage to slide along the rail in the X-direction.

In addition to drive motors, various moving parts, bearings, and wafer, the wafer-supporting stage may carry a position detector. The position detector may be a laser-distance interferometer that is usually heavy, and requires environmental shielding of the optical path and slow motion in order to achieve high accuracy readings.

Hollis, U.S. Pat. No. 5,153,494, describes an apparatus capable of moving light loads in X, Y, and yaw (rotation around the Z axis) in limited range and with high speed. Vibrations of the stationary portions of the apparatus are reduced by a momentum-canceling design. The momentum canceling design includes, in addition to the movable wafer-supporting stage, a non-coplanar moving element that moves in a momentum canceling manner with respect to the movable wafer-supporting stage. The motors include fixed permanent magnets and coils that are attached to the wafer-supporting stage and move along with the wafer-supporting stage.

Trumper, U.S. Pat. No. 5,196,745, describes an apparatus capable of providing movement in the 200 to 300 mm range in one or two degrees of freedom and having precision control in the 10 nm range in the remaining degrees of freedom. Linear motion of the wafer-supporting stage is provided by a motor having an array of permanent magnets attached to the movable wafer-supporting stage and a fixed array of commutating coils attached to the stator. The commutating coils have coupled magnetic flux lines. Current is allowed to flow only in those sections of the array where the motion takes place, in order to reduce energy losses in the coils. The motion is facilitated by magnetic bearings.

SUMMARY OF THE INVENTION

In one aspect, the invention features a device positioning apparatus having a stage configured to support the device, a platen supporting the stage, and a plurality of drive motors, co-planar with the stage and arranged around the stage, that apply drive forces directly to the stage without any mechanical contact to the stage. The drive forces impart planar motion to the stage in at least three degrees of freedom of motion. A plurality of fluid bearings operate between the stage and the platen and constrain the planar motion of the stage in all remaining degrees of freedom. A controller connected to the drive motors controls operation of the drive motors. Each drive motor has a top stationary coil, a bottom stationary coil, and a movable magnet adapted to move in a gap of predetermined length formed in-between the top and bottom stationary coils.

The arrangement according to the invention makes it possible, in certain embodiments, for there to be only one monolithic movable part. This arrangement allows the stage to be made very stiff, which in turn promotes use of very high servo gains in the controller. Benefits of this arrangement can include good precision, fast settling time, and small servo-tracking error.

Because the motors are provided in a movable magnet configuration, the drive coils can remain stationary, thus eliminating any need to attach leads to the movable stage. This arrangement improves the reliability of the coils, because their leads are not flexed.

In some embodiments the stage may be a small-motion stage, and the apparatus may include a large-motion stage that moves on a plane parallel to a plane of motion of the small-motion stage. This arrangement allows a heavy load processing equipment, e.g., laser, to be carried by a low performance large-motion element that can scan the full range of the wafer. The light load wafer can be supported by a high-precision, high-speed, small-motion stage that scans the small range of the individual devices on the wafer.

In another aspect, the invention includes a force cancellation system that applies cancellation forces to the device positioning apparatus. The cancellation forces are co-planar with the center of gravity of the stage and any components that move with the stage and cancel forces generated by the planar motion of the stage. Because both the drive forces and cancellation forces are on the same plane, no net moments are created out of the plane that may cause deflections in the stage and may result in lower precision. This planar configuration results in high servo loop stiffness, a fast settling time, and high precision.

In another aspect, the invention features a position detector that includes at least one interferometric encoder. The encoders are insensitive to environmental disturbances such as change in temperature, humidity, or barometric pressure, thus reducing the need for controlling the ambient environment of the positioning apparatus and thereby reducing cost. Interferometric encoders can be relatively inexpensive, have low weight, and can be configured in a moving grid configuration, which keeps the read head electronics and associated leads stationary. Reliability can be improved by eliminating lead flexing with movement of the stage.

In another aspect, the invention features a controller that controls the operation of the drive motor and includes a trajectory planner that receives a description of a desired trajectory, produces stage drive commands and force cancellation commands for the drive motors and the force cancellation system, respectively, and compensates for phase lag between the stage drive commands and the force cancellation commands. The controller also includes a digital controller that receives commands from the trajectory planner and feedback signals, and compares the feedback signals to the commands and generates correction signals for the drive motors.

Other features and advantages of the invention will be apparent from the following detailed description, the drawings, and the claims.

DETAILED DESCRIPTION

Figure 1:
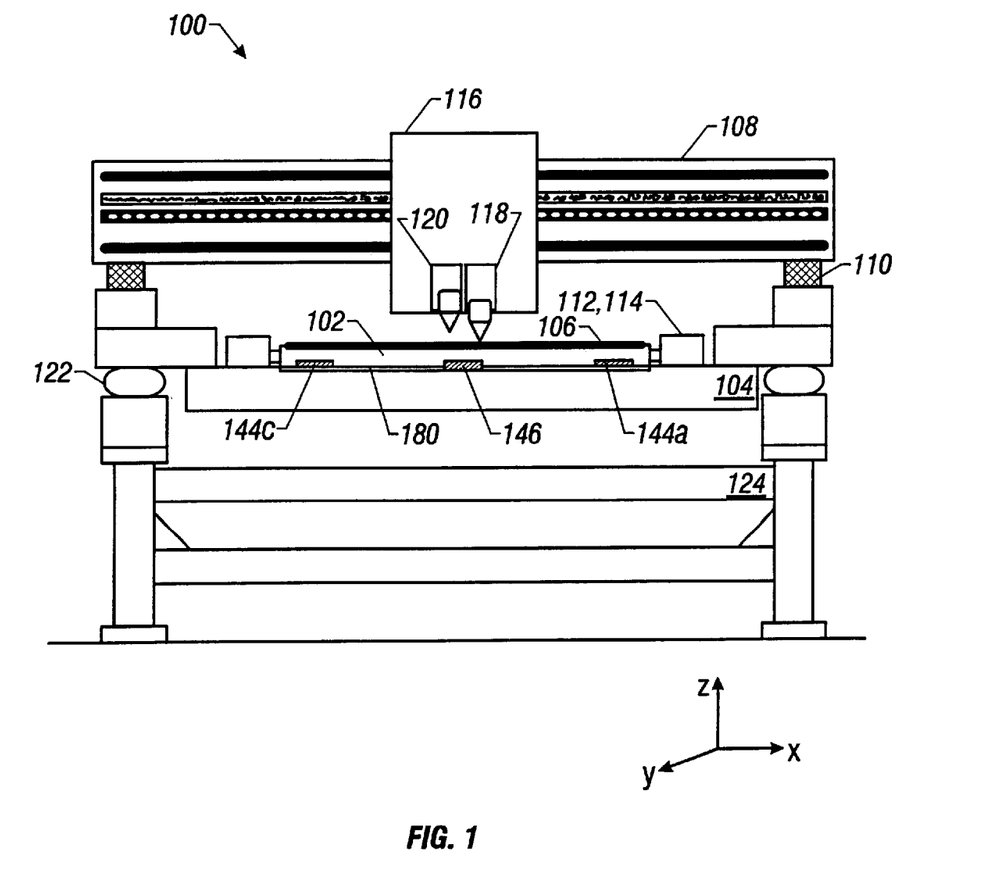
FIG. 1 is a side view of a wafer positioning apparatus according to an embodiment of the invention.

Referring to FIG. 1, a semiconductor wafer positioning apparatus 100 according to the invention includes a small-motion X-Y stage 102 that can be used to support, for example, a semiconductor wafer 106. Stage 102 is capable of moving the wafer 106 over a small field in the X and Y directions. In one example the field size is 35×35 millimeters square and the precision of the motion is 10 nanometers.

Stage 102 is supported by a platen 104. Air bearings 144a to 144d operate between the stage and the platen. The stage/platen assembly is placed on an optical table 124, which is mounted on vibration isolated legs 122.

Two large-motion stages 108 and 110 move an equipment box 116 along the X-axis and along the Y-axis, respectively. In one example, the large motion field size is 300×300 millimeters.

The equipment box 116 may contain a microlithography laser 118, an inspection lens system 120, or other processing equipment. The combination of the stacked stages 102, 108, and 110, provides de-coupling of the large motion for the heavy load processing equipment 118, 120 from the high-speed and high-precision small motion for the light stage 102 that supports the wafer.

Figure 2:
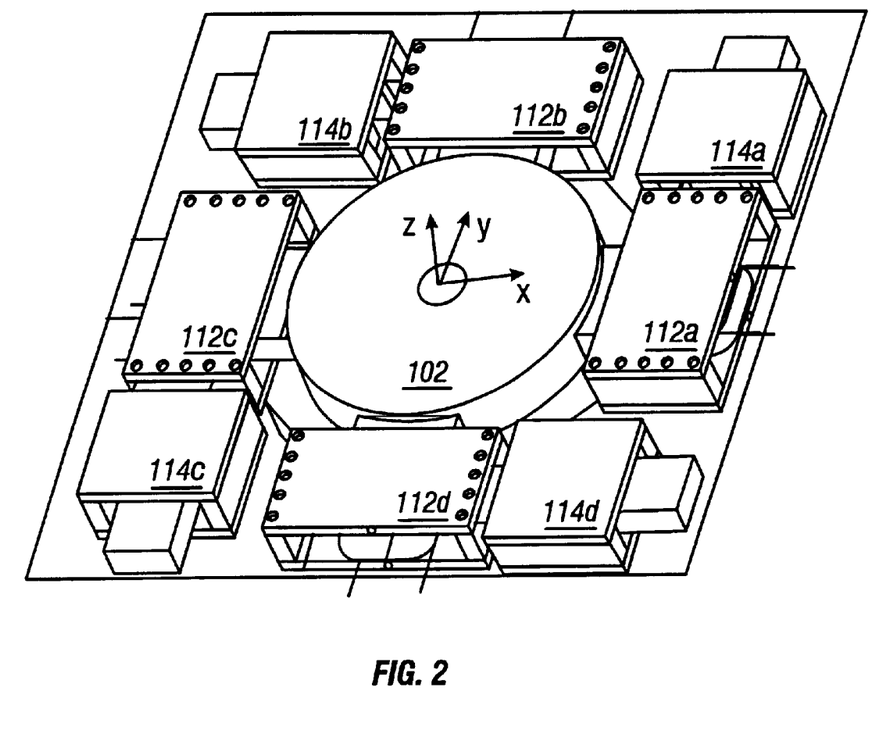
FIG. 2 is a perspective view of the wafer positioning apparatus and the drive and force cancellation motors of the apparatus of FIG. 1.

Stage 102 is movable in the X and Y directions, driven by two pairs of drive motors 112a, 112c, and 112b, 112d, respectively (FIG. 2). The four drive motors lie on the same plane as the stage and are arranged symmetrically around the stage on opposite sides of the stage. They provide drive forces directly to stage 102 without any mechanical contact. In addition to the X and Y motion the motors can rotate the stage around the Z direction (yaw).

Figure 3:
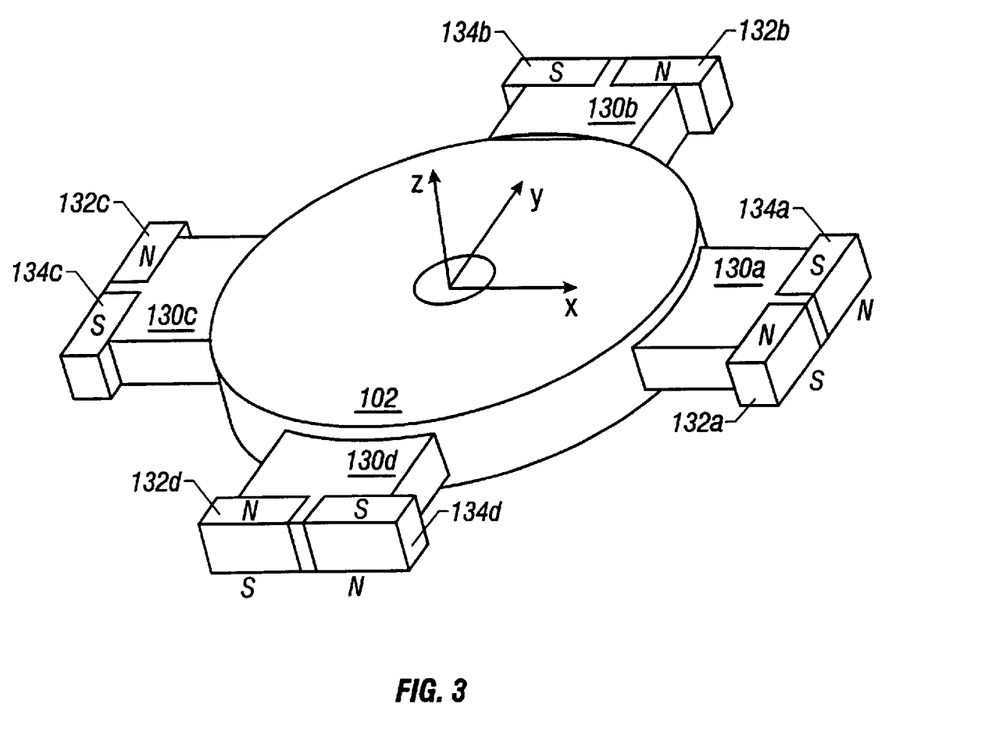
FIG. 3 is a perspective view of the stage of the wafer positioning apparatus.
Figure 4:
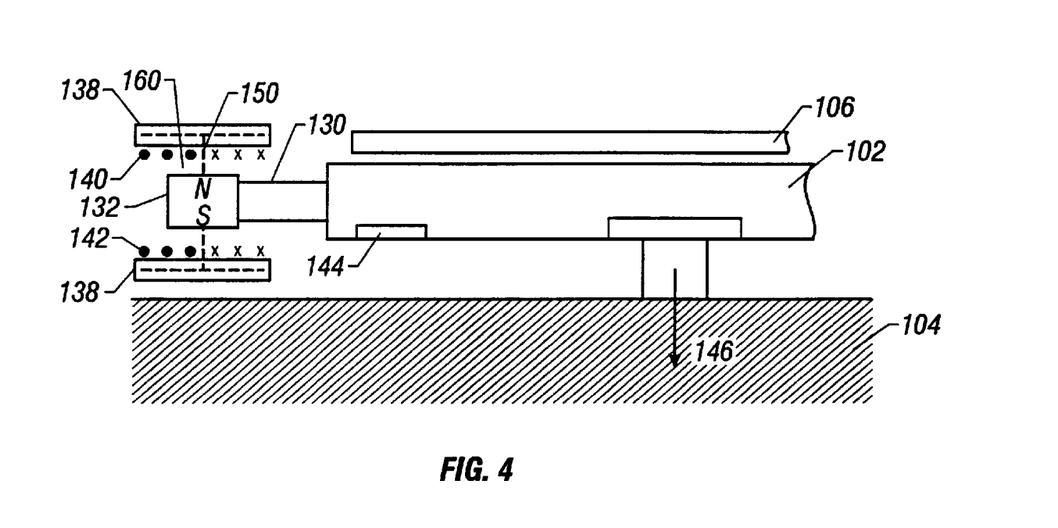
FIG. 4 is a cross-sectional side view of part of the stage.
Figure 7:
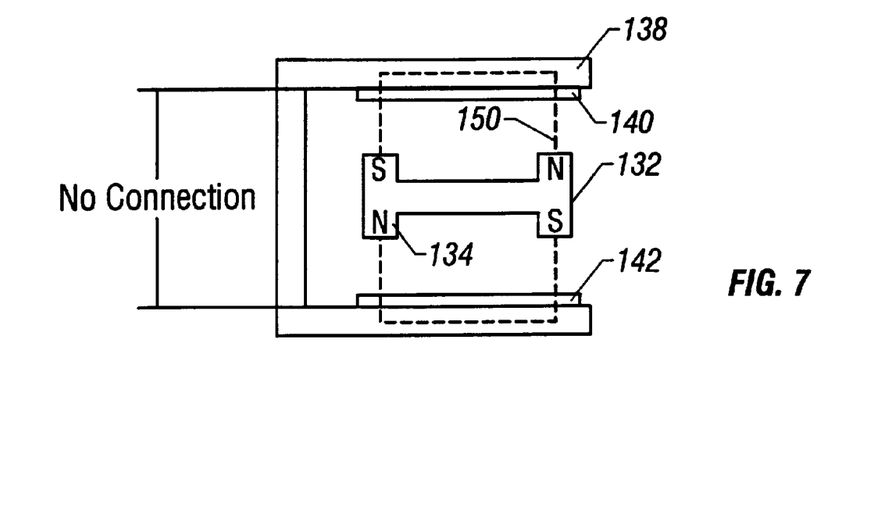
FIG. 7 is a side view of a portion of the stage and a portion of a drive motor.

Referring to FIG. 3, stage 102 has four wings 130a to 130d. At the free end of each wing, e.g., 130a, there are two oppositely magnetized permanent magnets, e.g., 132a and 134a. The permanent magnets are placed in a gap 160 formed between two stationary coils 140 and 142 (FIG. 4). The stationary coils are formed on the surfaces of a magnetically permeable material 138, which acts as a return plate for magnetic flux lines 150 originating from the permanent magnets (FIG. 7). The permanent magnets form the armature of the motor and the stationary coils with the return plate form the stator part of the motor. Because a current is applied to the stationary coils, a force is induced that acts on the permanent magnets, causing them to move together with the stage. In one example, the permanent magnets may be Iron Neodymium Boron and the magnetically permeable material may be soft iron.

Figure 5:
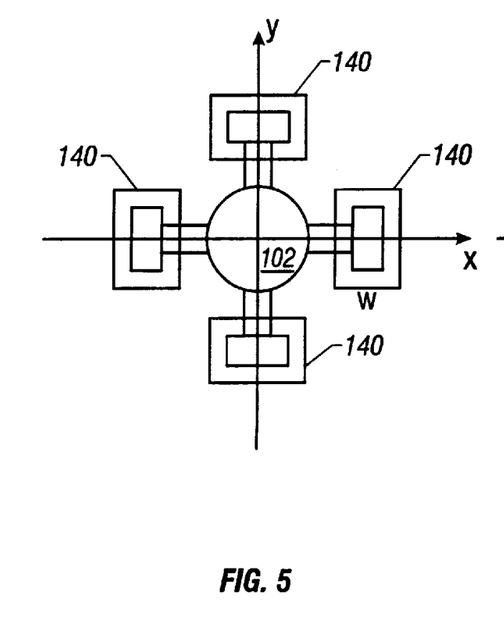
FIGS. 5 and 6 are diagrammatic views of the stage moving in the X-direction.
Figure 6:
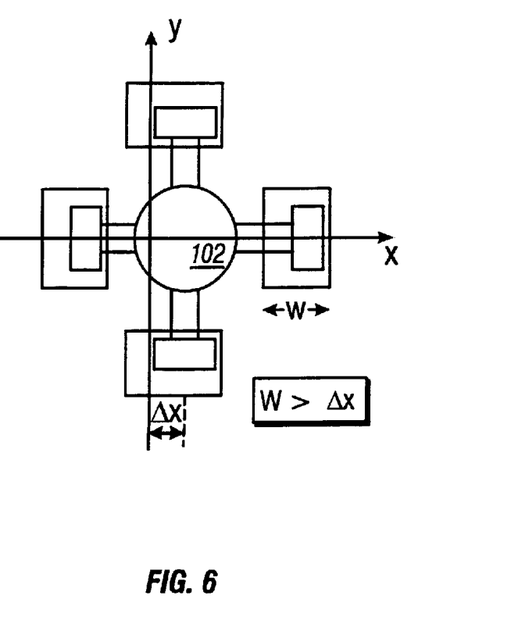

Referring to FIGS. 5 and 6, the dimensions of the coils of the four motors are chosen to be wide enough so that any movement in one direction (e.g., X) will maintain the flux lines of the permanent magnets in the other direction (e.g., Y) fully coupled with the coils.

In the moving magnet configuration, the point at which the drive force is applied to each wing of the stage remains stationary relative to the center of the movable stage. This arrangement results in a simple servo controller.

With reference to FIG. 2, four drive motors are used to drive stage 102. In other embodiments three or more than four motors may be used (three motors constitute the minimum need to control three degrees of freedom). The four-motor configuration can also utilize the minimum coil size necessary to cover a rectilinear field size. A short coil length results in low power losses.

With reference to FIGS. 4 and 7, the drive coil is split into two coils: top coil 140 and bottom coil 142. The two coils 140, 142 may be connected in series or in parallel, or may be driven independently of each other in order to provide control over the forces generated by the two halves of the drive coil. This arrangement can be used to create small roll (rotation around the X axis) and pitch (rotation around the Y axis) motions in addition to the X, Y and yaw. Active control of roll and pitch motions can be used to compensate for imperfections in manufacturing tolerances that could lead to misalignment of the stage while ensuring that no net moments are applied to the air bearings 144a–144d (FIG. 8) as a result of motor forces. If coils 140, 142 are driven independently of each other, the ratio of current in top coil 140 relative to the current in bottom coil 142 can be controlled so as to ensure that the resultant net force is applied in the plane of the center of gravity of the moving components.

Heat is generated at the coils 140, 142. Because the coils are bonded to the magnetically permeable material 138, they can be cooled without disturbing motion of the stage and any precision metrology that may be embedded in the stage.

The stators, including the top and bottom coils 140, 142 and the magnetically permeable material 138, are kinematically mounted to the platen. This construction allows the stators to change size due to thermal expansion without stressing the platen, and reduces heat conduction from the stators to the platen, thereby allowing the temperature control of the stators to be simple and inexpensive. In an alternative construction, the platen is kinematically mounted to a sub-frame that is allowed to expand thermally without affecting precision metrology.

Figure 8:
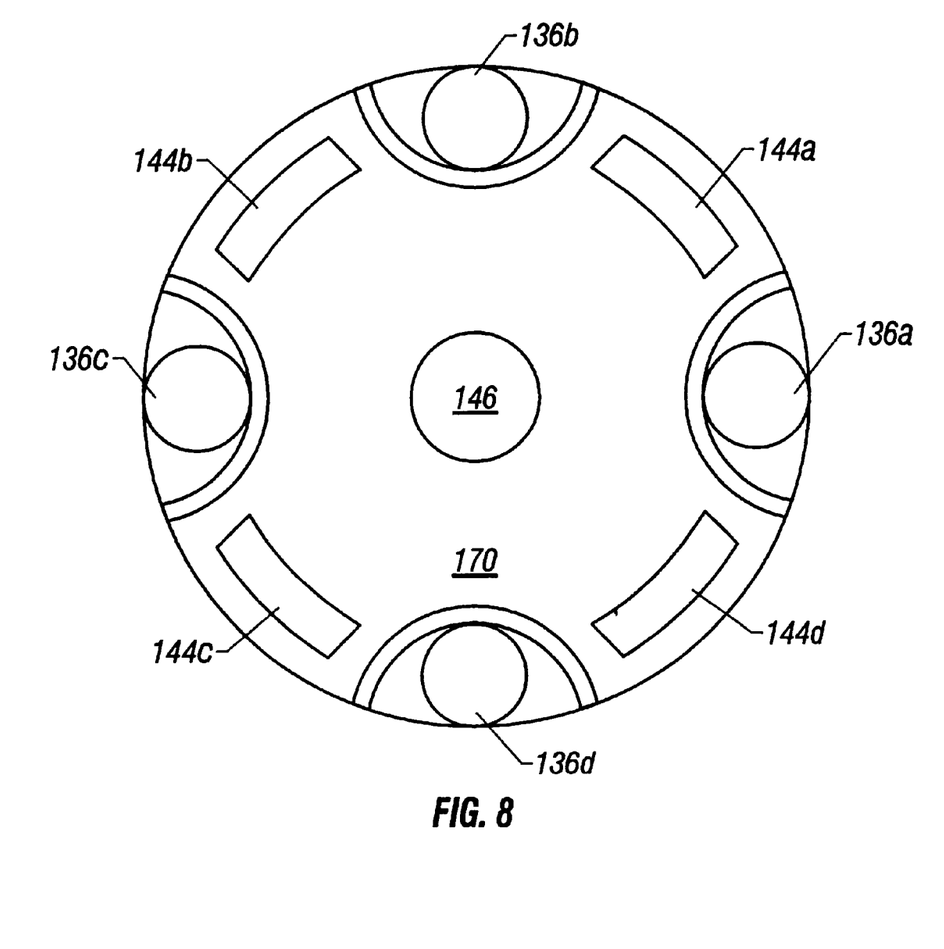
FIG. 8 is a view of the bottom surface of the stage.

Referring to FIG. 8, air bearings 144a to 144d operate between the bottom surface 170 of stage 102 and the top surface of platen 102. The stiffness of the air bearings is improved by pre-loading the bearings with a vacuum 146 drawn in the gap 180 between stage 102 and the platen 104, as shown in FIG. 1. Because the air bearing stiffness is controlled, the small-motion stage is constrained in the Z direction and with respect to rotation around the X-axis (roll) and around the Y-axis (pitch).

Air bearings provide a frictionless support between the stationary platen and the stage that is free of high-spatial frequency kinematic errors. A one-time metrology process can easily map the small amplitude of built-in form errors that do exist in the platen.

The movable magnet configuration facilitates a large fluid bearing pre-load by offsetting the magnets in the vertical gap between the drive coils and return flux paths. The extra pre-load provided by the magnets contributes to improved bearing stiffness, which has the benefits of good precision, fast settling time, and small servo-tracking errors.

The plane of action of the drive motors is matched to the plane containing the center of gravity of the moving components. Forces that drive the center of gravity of the moving components do not cause undesirable deflections of the fluid bearings. The de-coupling between drive forces and fluid bearing deflections improves servo loop stiffness and reduces the time required to achieve high precision following an acceleration.

The air bearings are not over-constrained. An over-constrained air-bearing is difficult to manufacture due to precise tolerances that must be maintained over relatively large distances. Because the bearings do not require precision tolerances in their manufacture, their cost can be low.

Figure 9:
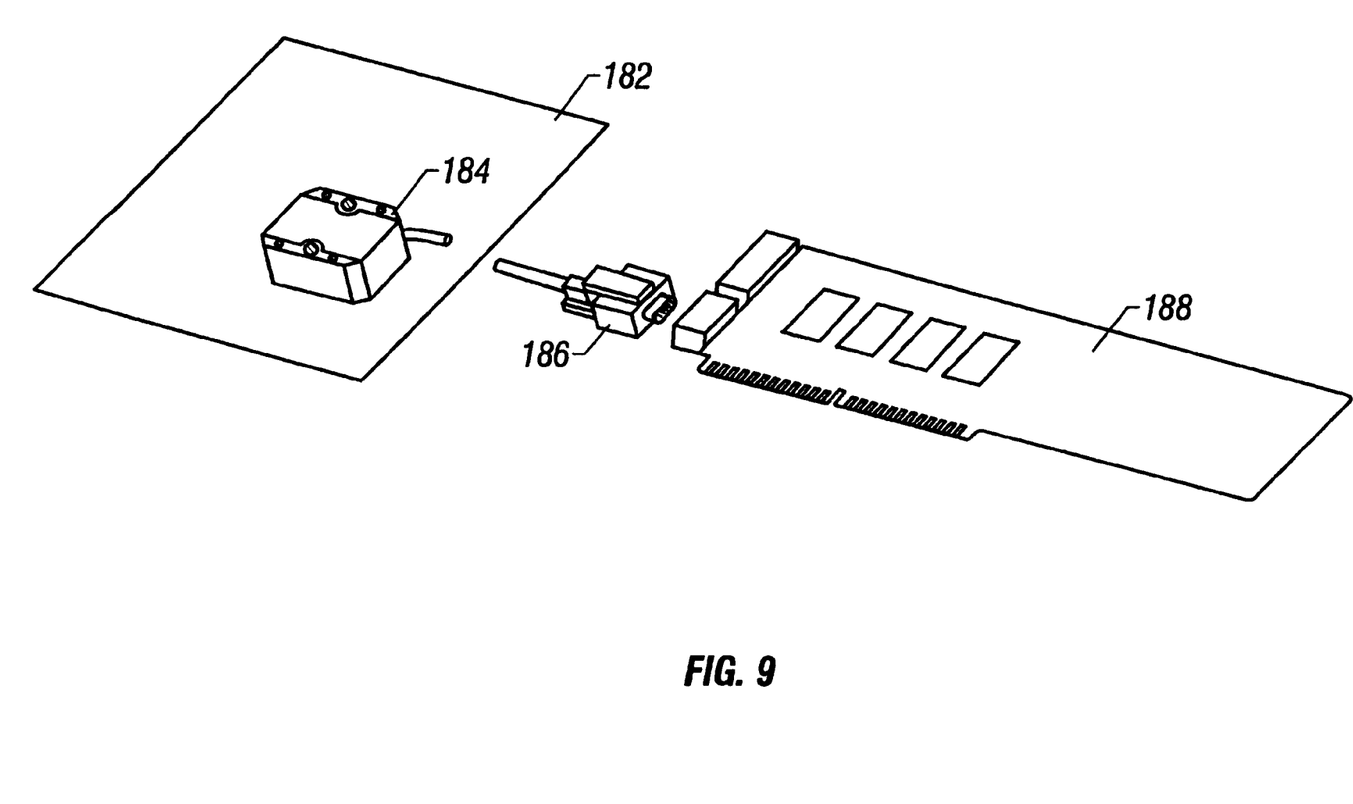
FIG. 9 is a drawing of an interferometric encoder used in connection with the wafer positioning apparatus of FIG. 1.
Figure 10:
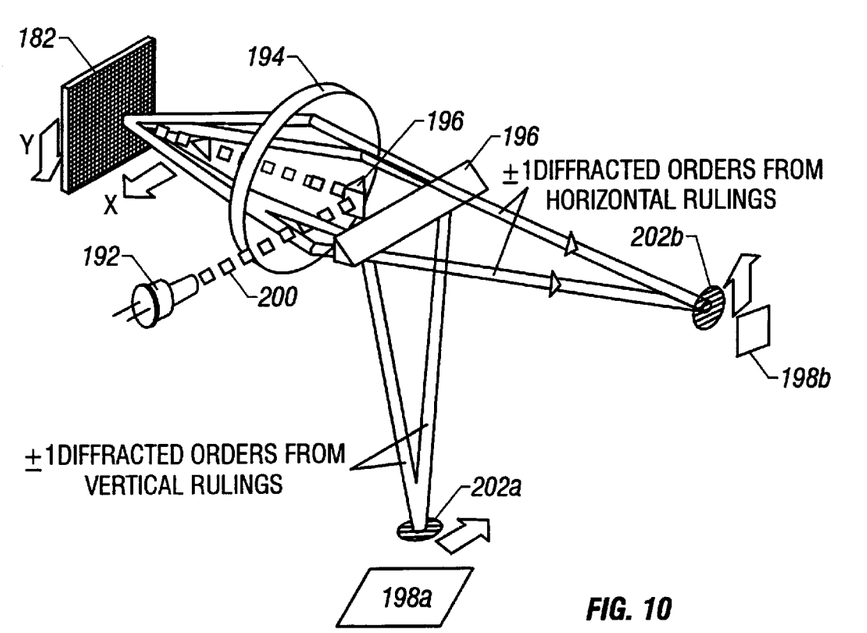
FIG. 10 is a drawing of portions of the interferometric encoder, showing an optical path signal.
Figure 11:
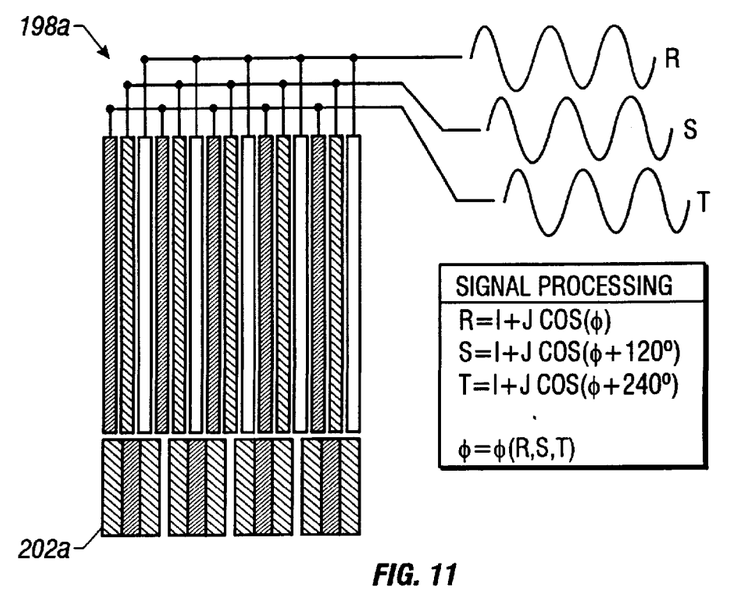
FIG. 11 is a schematic representation of three detector arrays of the interferometric encoder, as well as detector array signals, and an interference pattern associated with the detector arrays.

One method of position feedback is based on the use of interferometric encoders 136a to 136d placed at the bottom surface 170 of the stage, as shown in FIG. 8. Referring to FIG. 9, an interferometric encoder includes a two-dimensional encoder grid 182, a sensor head 184, and a connector 186 connecting the sensor to an interface card 188, which plugs into a computer (not shown). The two-dimensional grid 182 has a 10-micrometer scale etched on borosilicate glass. The grid is attached to the movable stage. The sensor head 184 is attached to the platen and includes, as shown in FIG. 10, a laser diode source 192, lenses 194, prism-mirrors 196, and detectors 198a, 198b. The optical path between the grid and the sensor head is enclosed. The laser 192 directs a light beam 200 focused through the lenses 194 to the grid 182. The beam 200 is diffracted by the grid and interference patterns 202a and 202b are formed from the two separate dimensions of the grid. Each of the two interference patterns 202a and 202b is imaged onto detector arrays 198a and 198b. The detector arrays generate signals that can be processed to make accurate phase measurements. When the diffraction grating moves relative to the sensor head the interference patterns move across the detector arrays, generating, as shown in FIG. 11, signals R, S, and T, which are 120 degrees apart in phase. These signals are electronically processed by a computer to provide accurate measurement of the phase. This technique results in phase resolution of 1 part in $2^{14}$, which corresponds to a length resolution of 0.3 nm.

The interferometric encoders may be manufactured by, for example, Micro E (Massachusetts) or Optra, Inc. (Topsfield, Mass.).

The encoders are insensitive to environmental disturbances such as change in temperature, humidity, or barometric pressure, thus eliminating any need for controlling the ambient environment of the wafer positioning apparatus and thereby providing low cost. The enclosed optical path for the encoders beneath the stage is free of turbulence, thus allowing the positioning electronics to operate at a high bandwidth, which allows higher servo loop stiffness.

Interferometric encoders are relatively inexpensive, have low weight, and are configured in a moving grid configuration, which keeps the sensor head electronics and associated leads stationary. Because there is no lead flexing with movement of the stage, reliability is high.

The precision of the encoders is locked into the encoder grid. There may be errors in the grid, but these errors can be measured once and the correction can be part of the metrology control system. A look-up table that is established once when the wafer positioning apparatus is assembled can easily correct the grid errors.

Position feedback may also be implemented by conventional laser interferometer means.

In order to cancel forces caused by the movements of the stage, a force cancellation system is provided as an integral component of the wafer positioning apparatus. Referring again to FIG. 2, the force cancellation system includes four force cancellation motors 114a to 114d co-planar with stage 102 and arranged around the stage. The cancellation motors apply cancellation forces to stationary portions of the wafer positioning apparatus, which are directed opposite to the forces generated by the planar motion of the stage.

Integral force cancellation allows much higher accelerations and less wait time after acceleration intervals and before full system accuracy is achieved. The force canceling capability also helps to prevent the stage from shaking any precision components that move with the stage.

The plane of action of force cancellation is also located in the same plane that will contain the center of gravity of the moving parts of the apparatus (stage 102 combined with any component that the stage is designed to support and move). Because both the drive forces and cancellation forces are on the same plane, no net moments are created out of the plane that may cause deflections in the stage and may result in lower precision. This planar configuration results in high servo loop stiffness, fast settling, and high precision.

Figure 12:
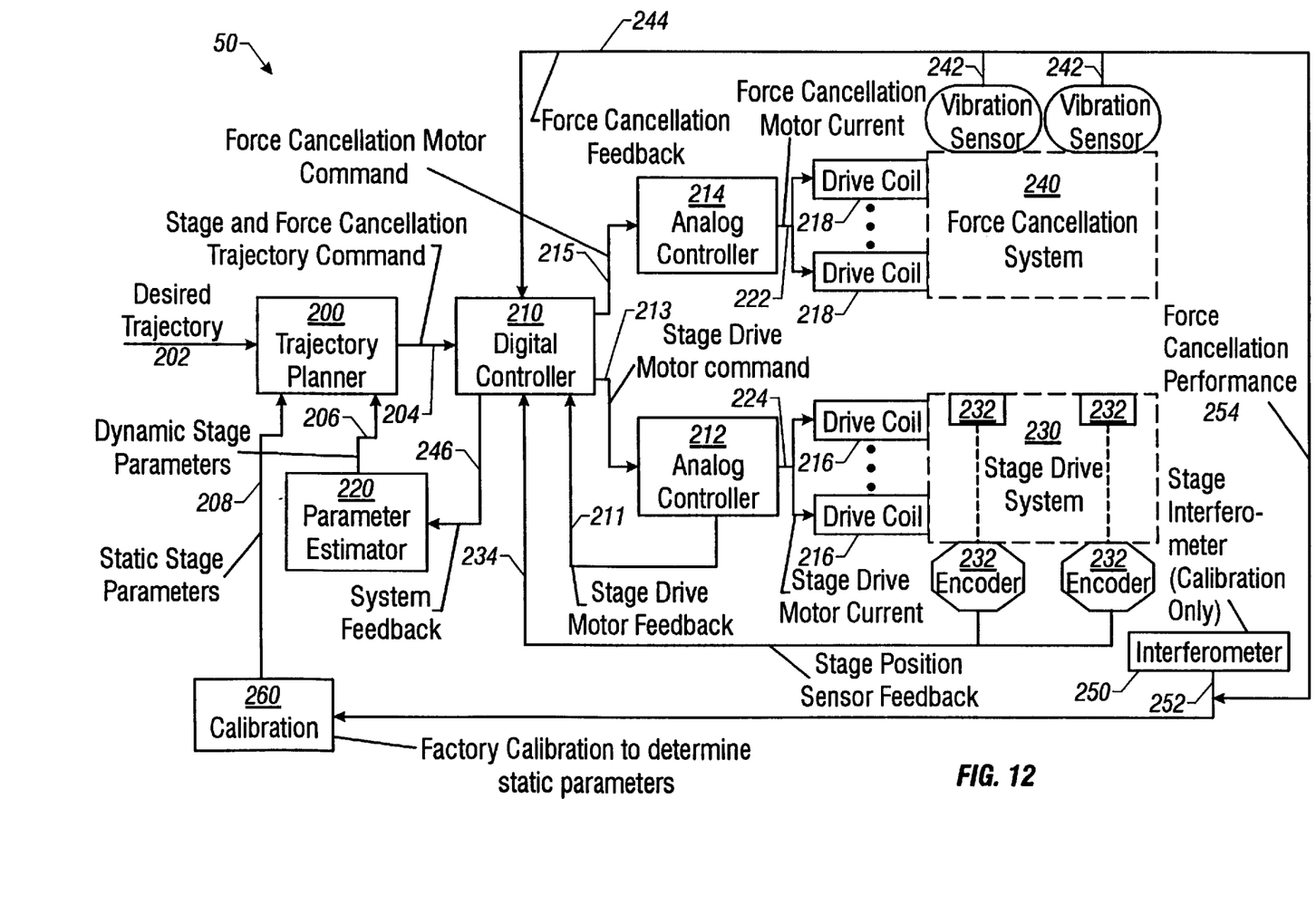
FIG. 12 is a block diagram of a stage control system that can be used to control the stage of the apparatus of FIG. 1.

Referring to FIG. 12 the main components of control system 50 are the trajectory planner 200 and the digital controller 210.

The trajectory planner 200 receives a description of a desired trajectory 202 and produces set points for the stage position servo, and the corresponding force feed-forward commands for both the stage drive motors 230 and the force cancellation motors 240. The trajectory planner is configured to compensate for phase lag between the stage drive feed-forward commands and the force cancellation feed-forward commands.

The digital controller 210 receives the stage position and feed-forward commands 204 for the drive and force cancellation motors from trajectory planner 200. The digital controller 210 also receives feedback signals 244, 234, and 211 from force cancellation sensors 242, stage position sensors 232, and drive motor analog controllers 212, respectively. The digital controller processes the sensor signals 242, 234, and 211 to determine the state of the wafer positioning apparatus, compares the state to the desired state, and generates the proper correction signals 213 and 215, which are applied to analog controllers 212 and 214. The digital controller also provides the state information 246 to a parameter estimator 220.

Analog controllers 212 and 214 control the currents to stage drive motor coils 216 and the force cancellation motor coils 218, respectively. Drive motor analog controller 212 provides a drive motor feedback signal 211 to the digital controller. Drive motor feedback signal 211 is an estimate of the velocity of the stage calculated using a model of the drive motor and measurement of the drive coil voltage and current.

Analog controllers 212 and 214 provide relatively large currents 224 and 222 required to drive the linear drive and force cancellation motors, respectively. Each analog controller has linear dual output stages. The dual output stages can be connected in parallel to provide double the drive current into a low impedance coil. The dual outputs can also be driven in a master/slave configuration in order to drive the top/bottom coils of each stage drive motor. In one example, the slave output may deliver a multiple between 0.95 and 1.05 of the current delivered by the master. This fixed ratio can be adjusted to compensate for manufacturing tolerances in the wafer positioning apparatus and the drive motors and thereby ensure that the net drive force applied by each drive motor is applied at the center of gravity of the moving components.

The digital controller receives stage position feedback 234 from stage drive system 230 through four channels of position sensors 232 (encoders or interferometers). Because the stage has only three degrees of freedom, one channel of feedback is redundant. This redundancy is exploited in the digital controller to derive a best-fit estimate of stage position and also to provide an estimate of the quality of the sensor signals. The quality of the sensor signals is simply the residual between the best-fit estimate of stage position and the four measurements from which the fit was estimated. The digital controller software monitors the quality measurement and will execute shutdown procedures if the quality exceeds preset limits.

Vibration sensors 242 (either geophones or accelerometers) are included on the wafer positioning apparatus to monitor the force cancellation performance. A calibration system 260 monitors the force cancellation performance during the manufacture of the wafer positioning apparatus and adjusts the feed-forward gains 208 (static parameters).

A parameter estimator 220 is also provided in the controlling software. The parameter estimator 220 looks at the desired trajectory and the actual state variables of the stage drive system and force cancellation system and derives an improved estimate 206 of the parameters to be used by the trajectory planner 200. The goal of the parameter estimator is to drive the dynamic error of the stage to be near zero at all times. For this condition to occur, the trajectory planner 200 must provide force commands that correspond nearly perfectly to the desired position trajectory. Nearly perfect correspondence requires excellent knowledge of amplifier gains, stage mass, motor location relative to the stage, and similar parameters. Errors in the model of the wafer positioning apparatus may lead to tracking errors when the stage executes a motion profile. As the system model gets better, due to operation of the parameter estimator 220 leading to continuous improvement in accuracy of the model, the stage will execute a trajectory with less settling time. In addition to improved performance, the limits on tracking errors can be set ever tighter in the digital controller as the model is improved. Very tight tolerances on tracking errors allow the digital controller to detect errors, collisions, or other unanticipated events faster, which ensures good safety of the system.

The calibration system 260 measures and corrects geometric errors in stage position sensors 232 and establishes baseline parameter values that will be subsequently improved by the parameter estimator. The calibration system 260 can also be used to make off-line calibration. For off-line calibration the calibration system 260 may use additional sensors and software.

The trajectory planner 200 is designed to perform specific tasks. For the task of re-positioning a semiconductor element for the purpose of memory repair, for example, the trajectory is specified as a sequence of segments. The segments include a Position/Velocity/Time segment, and a Cruise-velocity/Distance segment.

The Position/Velocity/Time segment specifies initial and final position and velocities and the time allotted to perform the movement. The trajectory planner determines the position and corresponding force profiles necessary to satisfy the end-point conditions. The path taken along the movement is not constrained. A special condition of zero time indicates that the trajectory planner should use the minimum time necessary for the movement subject to actuator or other limitations.

The Cruise-velocity/Distance segment is used to perform most processing operations. Only the length of this segment is specified. The velocity for the segment is specified by the endpoint of the preceding segment. The Cruise-velocity/Distance segment cannot be the first segment in a trajectory. Processing commands may be linked to the Cruise-velocity/Distance segment type.

Other types of segments may be used in other applications.

The trajectory planner 200 expands a trajectory specified as an ordered list of trajectory segments into a list of trajectory points that will be issued at a predetermined update rate to the digital controller. The trajectory planner operates in near real-time at a slight preview interval to the actual motion. A trajectory buffer 300 (FIG. 13) exists between the trajectory planner, the digital controller and the parameter estimator. The trajectory buffer 300 allows the rate of execution of the trajectory planner to be de-coupled from the digital controller rate. The trajectory planner must run sufficiently often to ensure that the trajectory buffer is never empty. There is a very slight delay at the start of a motion sequence that allows the trajectory planner to get far enough ahead of the digital controller that the buffer will not be empty. After the initial start-up delay (a few milliseconds), the time required to perform a motion is completely dependent upon the physical limitations of the hardware. There are no further software induced delays in the system.

The trajectory planner uses closed-form motion profiles in order to construct the trajectory segments. In one example, a linearly varying cycloidal acceleration profile is used for small motion in order to implement a Position/Velocity/Time segment type:

$$A(t)=(\sin(\pi*t/T)*(k_o+k_1*t)$$

Where:

A is Acceleration profile (or equivalently, force profile)

$k_o$ and $k_1$ are profile constants that are used to match trajectory endpoints T is segment duration (time)

t is time (independent variable)

This profile is a smoothly changing force profile over the course of the segment and has sufficient flexibility to meet the end-point constraints of the trajectory segment. Because the profile is smooth, the feed-forward force signals that correspond to the profile are smooth too. This result is beneficial because the feed-forward force signals are applied directly to the amplifiers and motors without additional filtering. Because the feed-forward force signals are applied in an open-loop configuration, the dynamics of the wafer positioning apparatus do not influence the applied force signals, thereby providing dramatically simple system dynamics.

Figure 13:
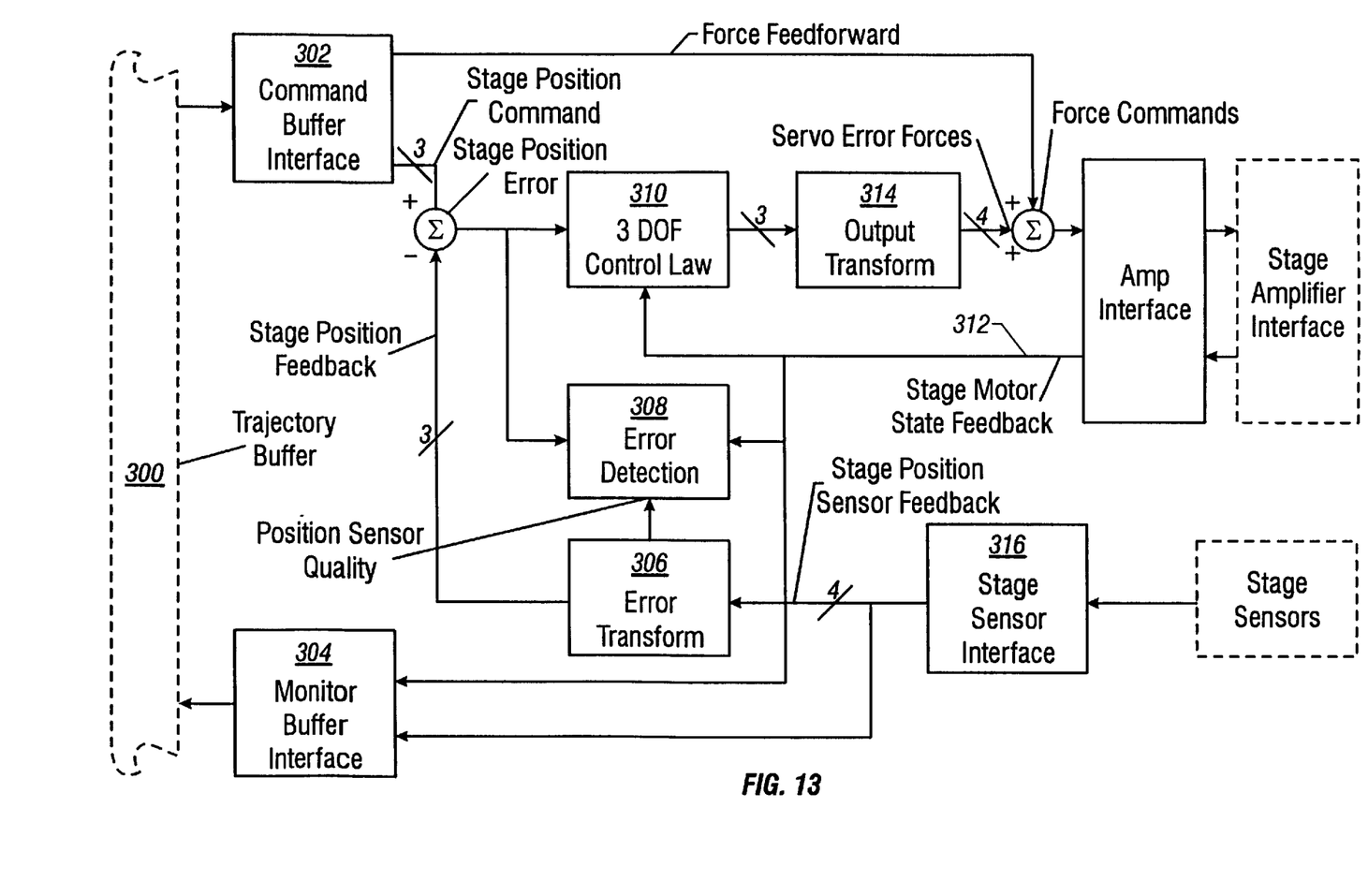
FIG. 13 is a block diagram of a digital controller of the stage control system of FIG. 12.

Referring to FIG. 13 the key elements of the digital controller 210 are a trajectory buffer 300, a command buffer interface 302, a monitor buffer interface 304, a feedback transform 306, an error detection block 308, a control law 310, an output transform 314, and a motor state feedback block 312.

The trajectory planner passes trajectory commands to the digital controller via trajectory buffer 300. Also, the digital recorder passes back data to parameter estimator 220 via trajectory buffer 300. This arrangement is implemented using a block of shared memory that can be accessed by both the low level processor (digital controller) as well as the higher level processor (trajectory planner and parameter estimator).

The command buffer interface 302 extracts force feed-forward and position set-point commands from trajectory buffer 300 and uses them in each update of the digital controller.

Monitor buffer 304 enters state information to parameter estimator 220 by inserting the measured data into trajectory buffer 300.

Four channels of stage position are measured through stage sensor interface 316. The four sensor readings are converted into a best fit estimate of the three degrees of freedom stage position (X, Y, yaw) by feedback transform 306. The quality of the sensors is also computed and monitored, along with additional measurements from the amplifier, by error detection block 308. Error detection block 308 initiates shutdown procedures whenever a failure is detected based on out-of-limits measurements. Shutdown may be initiated for poor sensor quality (e.g., excessive residuals in the feedback transform), if the position error exceeds a preset limit, if the estimated stage velocity exceeds a preset limit, and if the motor temperature or current exceeds a preset limit.

Control law 310 receives as input a three-degree-of-freedom position error signal and additional state information from the motors and produces three force commands that are designed to drive the tracking error to zero. The three forces resulting from control law 310 are transformed by output transform 314 into a minimum power vector that is applied in the moving magnet coordinate system by the four stage drive motors. The error forces are summed, in the moving magnet coordinate system, with the feed-forward force commands coming directly from the trajectory buffer. The resulting vector sum of forces is sent to the four analog controllers.

Stage motor state feedback block 312 monitors feedback from the analog controller. Monitored variables include motor current, armature velocity, and stator temperature.

The stage control system provides highly predictable response of the stage to force commands. The high degree of predictability allows the estimation of feed-forward forces to be made with great accuracy.

The actual force required to drive the stage may be slightly different from the predicted force profile. However, because of the high servo loop gains (which are also possible due to the simplicity of the wafer positioning apparatus and the absence of low frequency vibration modes), any errors in the predicted forces can be corrected with minimal tracking error. In one example, the required force profile may be predicted with better than 99 percent accuracy directly from the feed-forward path. Tracking error multiplied by the servo loop gain will generate the residual force required to drive the stage along a prescribed trajectory.

Because the vast majority of the forces (both drive and force cancellation) are predetermined, very effective force canceling is possible. This high degree of cancellation is possible without interaction or coupling of the system dynamics.

The use of the feed-forward model to generate the majority of the drive signal provides good safety. Because the closed loop servo controller supplies very little force, it is possible to set a very tight tolerance on position error. The tight tolerance on servo error allows faults to be detected and shutdown procedures to commence before substantial damage can be done to the system or any personnel. It is easy to detect when a maintenance person, for instance, applies an external disturbance to the wafer positioning apparatus such as via unanticipated touching.

Another advantage of the control architecture is the partitioning of the computation load amongst multiple processors, such as the trajectory planner and the digital controller. The digital controller is optimized to provide low-latency (measured in microseconds) computation in a highly deterministic faction in order to satisfy closed loop stability criteria. The trajectory planner operates with low deterministic behavior (latency measured in tens to hundreds of milliseconds). While a single processor with a suitable operating system could perform both functions, the partition facilities using multiple processors with a shared memory interface between them. This partition allows a dedicated digital signal processor to be used for the digital controller and a host with near real-time performance (such as UNIX or Windows NT) to implement the trajectory planer.

There has been described novel and improved apparatus and techniques for high-speed precision positioning. The invention is to be construed as embracing each and every novel feature and novel combination of features present in or possessed by the apparatus and technique herein disclosed. It is also evident that those skilled in the art may now make numerous uses and modifications of and departures from the specific embodiments described herein without departing from the inventive concept.

What is claimed is:

1. A device positioning apparatus comprising
    a stage configured to support the device,
    a platen supporting the stage,
    a plurality of drive motors co-planar with the stage and arranged around the stage that apply drive forces directly to the stage without any mechanical contact to the stage, the drive forces imparting planar motion to the stage in at least three degrees of freedom of motion,
    a plurality of fluid bearings operating between the stage and the platen, the fluid bearings constraining the planar stage motion in all remaining degrees of freedom,
    a controller connected to the drive motors and configured to control operation of the drive motors, and
    wherein each drive motor comprises
        a top stationary coil,
        a bottom stationary coil, and
        a movable magnet adapted to move in a gap of predetermined length formed in-between the top and bottom stationary coils.

2. The apparatus of claim 1 comprising three drive motors symmetrically arranged around the stage, that apply drive forces imparting motions to the stage in three independent degrees of freedom.

3. The apparatus of claim 1 comprising four drive motors symmetrically arranged on four opposite sides of the stage, that apply drive forces imparting motions to the stage in three independent degrees of freedom.

4. The apparatus of claim 1 comprising at least three fluid bearings.

5. The apparatus of claim 1 wherein the fluid bearing comprises a gas pressurized bearing.

6. The apparatus of claim 1 wherein heat is removed from the top and bottom coils by conduction to a fluid stream.

7. The apparatus of claim 1 further comprising a sub-frame, wherein the sub-frame supports the top and bottom coils, and the platen is kinematically connected to the sub-frame so that the coils can change size due to thermal expansion without applying stresses to the platen.

8. The apparatus of claim 1 wherein the top and bottom coils are independently driven.

9. The apparatus of claim 1 wherein the movable magnet comprises a permanent magnet.

10. The apparatus of claim 9 wherein the permanent magnet comprises an Iron Neodymium Boron magnet.

11. The apparatus of claim 1 wherein the movable magnet comprises two oppositely magnetized magnets.

12. The apparatus of claim 1 wherein the movable magnet comprises an electromagnet.

13. The apparatus of claim 1 wherein the stage is a small-motion stage, further comprising a large-motion stage configured to move on a plane parallel to a plane of motion of the small-motion movable stage.

14. The apparatus of claim 1 wherein the top and bottom stationary coils of each motor have larger dimensions than the movable magnet so that flux lines from the movable magnet are always fully coupled to the coils throughout the entire range of motion of the stage.

15. The apparatus of claim 1 further comprising
a force cancellation system configured to apply cancellation forces, co-planar with a center of gravity of the stage and any components that move with the stage, that cancel forces on the stage that are generated by the planar stage motion.

16. The apparatus of claim 15 wherein the force cancellation system comprises a plurality of force cancellation motors co-planar with the stage and drive motors and arranged around the stage, that apply cancellation forces to stationary portions of the device positioning apparatus, directed opposite to the forces generated by the planar stage motion.

17. The apparatus of claim 15 wherein the force cancellation system comprises a plurality of movable elements co-planar with the stage and arranged around the stage, configured to move in opposite direction of the stage, so that a center of gravity of the stage, any components that move with the stage, and the movable elements does not move.

18. The apparatus of claim 1 further comprising a position detector, comprising at least one interferometric encoder affixed to the stage, that provides a feedback signal to the controller representing position of the stage.

19. The apparatus of claim 18 further comprising a laser diode, a collimator, and a detector array.

20. The apparatus of claim 19 wherein an optical path between the laser diode, collimator, detector array, and the interferometric encoder is enclosed.

21. The apparatus of claim 1 further comprising a position detector, comprising a laser distance interferometer, that provides a feedback signal to the controller representing position of the stage.

22. The apparatus of claim 1 further comprising:
a force cancellation system that performs force cancellation with respect to the stage in response to force cancellation commands, and wherein the controller comprises:
a trajectory planner that receives a description of a desired trajectory, and produces stage drive commands and force cancellation commands for the drive motors and the force cancellation system, respectively, and
a digital controller that receives commands from the trajectory planner and feedback signals, and compares the feedback signals to the commands received from the trajectory planner and generates correction signals for the drive motors and the force cancellation system.

23. The apparatus of claim 22 wherein the digital controller generates correction signals for the force cancellation system.

24. The apparatus of claim 22 further comprising a parameter estimator that receives system state feedback signals comprising stage position and force cancellation state feedback, compares them to the desired trajectory, and derives improved estimates of parameters used by the trajectory planner to generate the commands received by the digital controller.

25. The apparatus of claim 22 wherein the position detector comprises position sensors further comprising a calibration system that measures and corrects geometric errors in the position detector sensors.

26. The apparatus of claim 25 wherein the position detector sensors are interferometric encoders.

27. The apparatus of claim 22 further comprising vibration sensors attached to the platen that provide force cancellation feedback signals.

28. The apparatus of claim 22 wherein the trajectory description comprises trajectory segments that are expressed in mathematical form with continuous derivatives of position and acceleration.

29. A device positioning apparatus comprising
a stage configured to support the device,
at least one drive motor that provides force directly to the stage without any mechanical contact to the stage, the force imparting motion to the stage in at least one degree of freedom,
a force cancellation system configured to apply cancellation forces co-planar with a center of gravity of the stage and any components that move with the stage, the cancellation forces cancelling forces generated by planar motion of the stage,
a controller configured to control operation of the drive motors and the force cancellation system, and
wherein each motor comprises
a top stationary coil,
a bottom stationary coil, and
a movable magnet adapted to move in a gap of predetermined length formed in-between the top and bottom stationary coils.

30. The apparatus of claim 29, wherein there are at least three drive motors co-planar with the stage and arranged around the stage that apply drive forces directly to the small-motion stage without any mechanical contact to the small-motion stage, the drive forces imparting planar motion to the small-motion stage in at least three degrees of freedom.

31. The device positioning apparatus of claim 29 further comprising a platen supporting the stage and a plurality of fluid bearings operating between the stage and the platen, the fluid bearings constraining the planar stage motion in all remaining degrees of freedom.

32. The device positioning apparatus of claim 29 wherein the stage is a small-motion stage, further comprising a large-motion stage configured to move on a plane parallel to a plane of motion of the stage.

33. The apparatus of claim 29 wherein the top and bottom stationary coils of each motor have larger dimensions than the movable magnet so that flux lines from the movable magnet are always fully coupled to the coils throughout the entire range of motion of the stage.

34. The apparatus of claim 29 further comprising a position detector, comprising at least one interferometric encoder affixed to the stage, that provides a feedback signal to the controller representing position of the stage.

35. The apparatus of claim 29 further comprising a position detector that provides a feedback signal to the controller representing position of the stage, and wherein the controller comprises:
   a trajectory planner that receives a description of a desired trajectory, and produces stage drive commands and force cancellation commands for the drive motors and the force cancellation system, respectively, and
   a digital controller that receives commands from the trajectory planner and feedback signals, and compares the feedback signals to the commands received from the trajectory planner and generates correction signals for the drive motors and the force cancellation system.

36. The apparatus of claim 35 further comprising a parameter estimator that receives system state feedback signals comprising stage position and force cancellation state feedback, compares them to the desired trajectory, and derives improved estimates of parameters used by the trajectory planner to generate the commands received by the digital controller.

37. A device positioning apparatus comprising
   a stage configured to support the device,
   at least one drive motor that provides force directly to the stage without any mechanical contact to the stage, the force imparting motion to the stage in at least one degree of freedom,
   a force cancellation system configured to apply cancellation forces co-planar with a center of gravity of the stage and any components that move with the stage, the cancellation forces canceling forces generated by planar motion of the stage, and
   a controller configured to control operation of the drive motors and force cancellation system.

38. The apparatus of claim 37, wherein there are at least three drive motors co-planar with the stage and arranged around the stage that apply drive forces directly to the small-motion stage without any mechanical contact to the small-motion stage, the drive forces imparting planar motion to the small-motion stage in at least three degrees of freedom.

39. A device positioning apparatus comprising
   a stage configured to support the device,
   at least one drive motor that provides force directly to the stage without any mechanical contact to the stage, the force imparting motion to the stage in at least one degree of freedom,
   a force cancellation system configured to apply cancellation forces co-planar with a center of gravity of the stage and any components that move with the stage, the cancellation forces canceling forces generated by planar motion of the stage, comprising a plurality of force cancellation motors co-planar with the stage and arranged around the stage, that apply cancellation forces to stationary portions of the device positioning apparatus, directed opposite to the forces generated by the planar stage motion, and
   a controller configured to control operation of the drive motors and force cancellation system.

40. The apparatus of claim 39, wherein there are at least three drive motors co-planar with the stage and arranged around the stage that apply drive forces directly to the small-motion stage without any mechanical contact to the small-motion stage, the drive forces imparting planar motion to the small-motion stage in at least three degrees of freedom.

41. A device positioning apparatus comprising
   a stage configured to support the device,
   at least one drive motor that provides force directly to the stage without any mechanical contact to the stage, the force imparting motion to the stage in at least one degree of freedom,
   a force cancellation system configured to apply cancellation forces co-planar with a center of gravity of the stage and any components that move with the stage, the cancellation forces canceling forces generated by the planar stage motion, comprising a plurality of movable elements co-planar with the stage and arranged around the stage, configured to move in opposite direction of the stage, so that a center of gravity of the stage, any components that move with the stage, and the movable elements does not move, and
   a controller configured to control operation of the drive motors and the force cancellation system.

42. The apparatus of claim 41, wherein there are at least three drive motors co-planar with the stage and arranged around the stage that apply drive forces directly to the small-motion stage without any mechanical contact to the small-motion stage, the drive forces imparting planar motion to the small-motion stage in at least three degrees of freedom.

43. A device positioning apparatus comprising
   a stage configured to support the device,
   at least one drive motor that provides force directly to the stage without any mechanical contact to the stage, the force imparting motion to the stage in at least one degree of freedom,
   a force cancellation system configured to apply cancellation forces co-planar with a center of gravity of the stage and any components that move with the stage, the cancellation forces canceling forces generated by the planar stage motion, comprising a plurality of movable elements co-planar with the stage and arranged around the stage, configured to move in opposite direction of the stage, so that no net torque is applied to a center of gravity of the stage, any components that move with the stage, and the movable elements, and
   a controller configured to control operation of the drive motors and force cancellation system.

44. The apparatus of claim 43, wherein there are at least three drive motors co-planar with the stage and arranged around the stage that apply drive forces directly to the small-motion stage without any mechanical contact to the small-motion stage, the drive forces imparting planar motion to the small-motion stage in at least three degrees of freedom.

45. A device positioning apparatus comprising
a stage configured to support the device,
at least one drive motor providing force directly to the stage without any mechanical contact to the stage, the force imparting motion to the stage in at least one degree of freedom, the drive motor comprising a top stationary coil, a bottom stationary coil, and a movable magnet adapted to move in a gap of predetermined length formed in-between the top and bottom stationary coils;
a controller configured to control operation of the drive motor, and
a position detector providing a feedback signal to the controller representing position of the stage, the detector comprising at least one interferometric encoder.

46. A device positioning apparatus comprising:
a stage configured to support the device;
at least one drive motor providing force directly to the stage without any mechanical contact to the stage, the force imparting motion to the stage in at least one degree of freedom;
a controller configured to control operation of the drive motor;
a position detector providing a feedback signal to the controller representing position of the stage, the detector comprising at least one interferometric encoder; and
a force cancellation system co-planar with the stage that performs force cancellation with respect to the stage and in response to force cancellation commands.

47. A device positioning apparatus comprising:
a stage configured to support the device;
at least one drive motor providing force directly to the stage without any mechanical contact to the stage, the force imparting motion to the stage in at least one degree of freedom;
a controller configured to control operation of the drive motor;
a position detector providing a feedback signal to the controller representing position of the stage, the detector comprising at least one interferometric encoder;
a platen configured to support the stage; and
and a plurality of fluid bearings operating between the stage and the platen, the fluid bearings constraining the planar stage motion in all remaining degrees of freedom.

48. A device positioning apparatus comprising
a stage configured to support the device,
at least one drive motor providing force directly to the stage without any mechanical contact to the stage, the force imparting motion to the stage in at least one degree of freedom,
a force cancellation system co-planar with the stage that performs force cancellation with respect to the stage and in response to force cancellation commands, and
a controller configured to control operation of the drive motor comprising:
a trajectory planner that receives a description of a desired trajectory, and produces stage drive commands and force cancellation commands for the drive motors and the force cancellation system, respectively, and
a digital controller that receives commands from the trajectory planner and feedback signals, and compares the feedback signals to the commands received from the trajectory planner and generates correction signals for the drive motors and the force cancellation system.

49. The apparatus of claim 48 wherein the trajectory planner is configured to compensate for phase lag between the stage drive commands and the force cancellation commands.

50. The apparatus of claim 48 further comprising a position detector that provides feedback signals to the digital controller representing position of the stage.

51. The apparatus of claim 48 further comprising a drive motor controller that provides feedback signals to the digital controller representing operation of the drive motors.

52. The apparatus of claim 48 further comprising a vibration sensor that provides feedback signals to the digital controller representing effectiveness of force cancellation.

53. The apparatus of claim 48 further comprising a parameter estimator that receives system state feedback signals from the digital controller comprising stage position and force cancellation state feedback, compares them to the desired trajectory, and derives improved estimates of parameters used by the trajectory planner to generate the commands received by the digital controller.

54. A device positioning apparatus comprising
a small-motion stage configured to support the device,
a platen supporting the small-motion stage,
at least three drive motors co-planar with the stage and arranged around the stage that apply drive forces directly to the small-motion stage without any mechanical contact to the small-motion stage, the drive forces imparting planar motion to the small-motion stage in at least three degrees of freedom,
at least three force cancellation motors configured to apply cancellation forces co-planar with a center of gravity of the stage and any components that move with the stage, wherein the cancellation forces are directed opposite to the forces generated by the planar stage motion, so that a center of gravity of the stage and any components that move with the stage does not move,
a controller connected to the drive motors and the force cancellation motors and configured to control operation of the drive motors and the force cancellation motors,
at least three fluid bearings operating between the stage and the platen,
a position detector providing a feedback signal to the controller representing position of the small-motion stage, the detector comprising at least three interferometric encoders,
a large-motion stage configured to move on a plane parallel to a plane of motion of the small-motion stage and to support semiconductor device processing equipment, and
wherein each motor comprises
a top stationary coil,
a bottom stationary coil,
a movable magnet adapted to move in a gap of predetermined length formed in-between the top and bottom stationary coils, and
the top and bottom stationary coils have larger dimensions than the movable magnet so that flux lines from the movable magnet are always fully coupled to the coils throughout the entire range of motion of the small-motion stage.

55. A method of operating a device positioning apparatus, comprising the steps of:
imparting motion to a large-motion stage that supports device processing equipment;

imparting motion to a small-motion stage in at least one degree of freedom, by controlling operation of at least one drive motor that provides force directly to the small-motion stage to impart motion to the stage, the small-motion stage having a trajectory in a plane parallel to a plane of motion of the large-motion stage, the small-motion stage supporting a device to be processed by the device processing equipment; and processing the device using the device processing equipment during a cruise-velocity segment of the trajectory of the small-motion stage.

56. The method of claim 55 wherein the device processing equipment comprises a laser and the device is a semiconductor device.

57. The method of claim 56 wherein the processing comprises memory repair.

58. A device positioning apparatus comprising:

device processing equipment;

a large-motion stage configured to the support device processing equipment and to impart motion to the device processing equipment in a plane of motion;

a small-motion stage configured to support the device and to impart motion to the device in a trajectory in a plane parallel to a plane of motion of the large-motion stage;

at least one drive motor that provides force directly to the small-motion stage to impart motion to the stage in at least one degree of freedom; and a controller configured to control operation of the at least one drive motor so as to impart motion to the small-motion stage;

the device processing equipment being configured to process the device during a cruise-velocity segment of the trajectory of the small-motion stage.

59. A method of operating a device positioning apparatus, comprising the steps of:

imparting motion to a large-motion stage that supports device processing equipment so as to cause the device processing equipment to move with the large-motion stage;

repositioning a device to be processed by the device processing equipment by repositioning a small-motion stage in at least one degree of freedom, by controlling operation of at least one drive motor that provides force directly to the small-motion stage to reposition the stage, the small-motion stage being repositioned from an initial position to a final position in a plane parallel to a plane of motion of the large-motion stage, the small-motion stage supporting the device to be processed by the device processing equipment; and processing the repositioned device using the device processing equipment.

60. The method of claim 59 wherein the device processing equipment comprises a laser and the device is a semiconductor device.

61. A method of operating a device positioning apparatus, comprising the steps of:

imparting motion to a large-motion stage that supports device processing equipment comprising a laser;

repositioning a semiconductor device to be processed by the device processing equipment by repositioning a small-motion stage in at least one degree of freedom, by controlling operation of at least one drive motor that provides force directly to the small-motion stage to reposition the stage, the small-motion stage being repositioned from an initial position to a final position in a plane parallel to a plane of motion of the large-motion stage, the small-motion stage supporting the semiconductor device to be processed by the device processing equipment; and processing the repositioned semiconductor device using the device processing equipment, wherein the processing comprises memory repair.

62. A device positioning apparatus comprising:

device processing equipment;

a large-motion stage configured to support device processing equipment and to impart motion to the device processing equipment in a plane of motion so as to cause the device processing equipment to move with the large-motion stage;

a small-motion stage configured to support the device and to reposition the device from an initial position to a final position in a plane parallel to a plane of motion of the large-motion stage;

at least one drive motor that provides force directly to the small-motion stage to reposition the stage in at least one degree of freedom; and a controller configured to control operation of the at least one drive motor so as to reposition the small-motion stage;

the device processing equipment being configured to process the repositioned device.

* * * * *